May 18, 1943. E. V. RIPPINGILLE 2,319,366
CLUTCH MECHANISM
Original Filed Feb. 6, 1939 4 Sheets-Sheet 2

Inventor
Edward V. Rippingille
By
Attorneys

May 18, 1943. E. V. RIPPINGILLE 2,319,366
CLUTCH MECHANISM
Original Filed Feb. 6, 1939 4 Sheets-Sheet 3
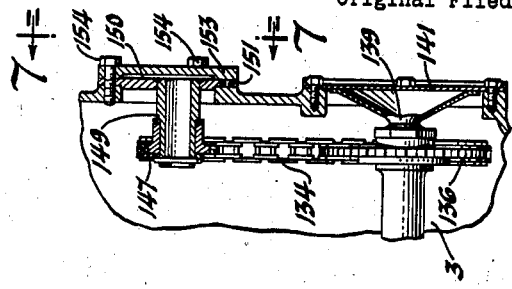
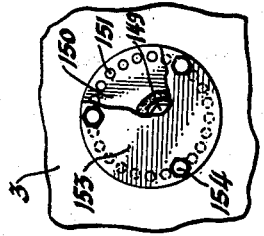
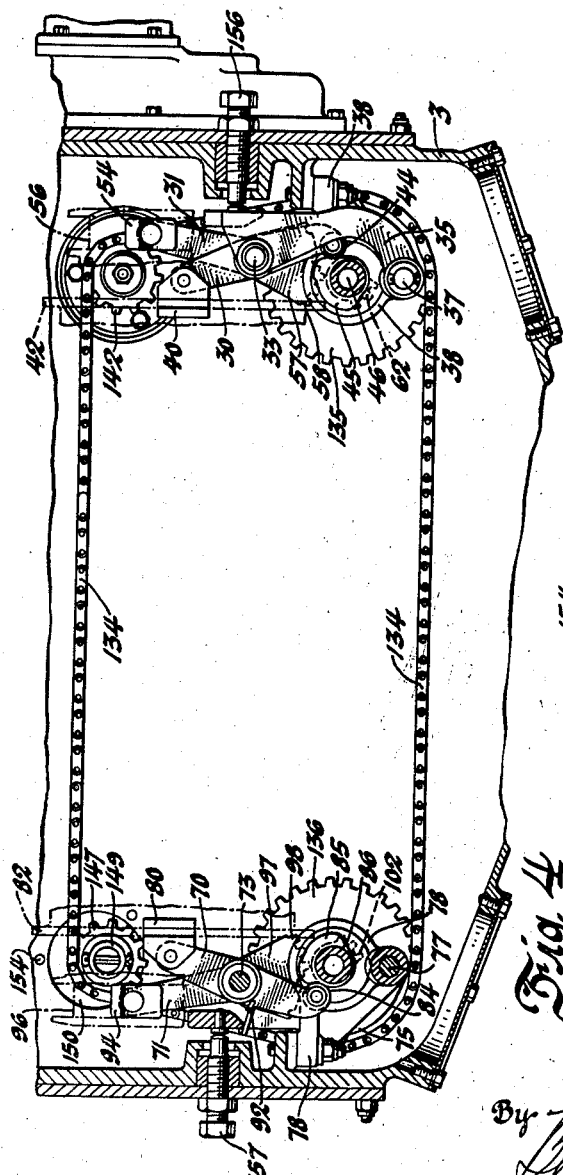
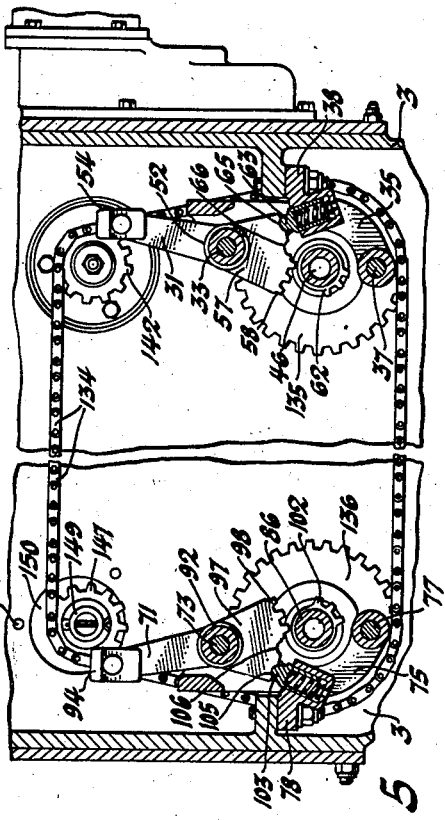
Inventor
Edward V. Rippingille
By
Attorneys May 18, 1943. E. V. RIPPINGILLE 2,319,366
CLUTCH MECHANISM
Original Filed Feb. 6, 1939 4 Sheets-Sheet 4
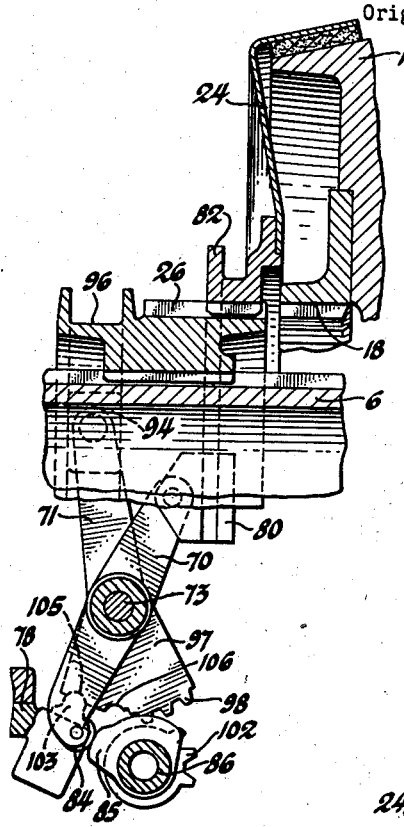
Fig. 8
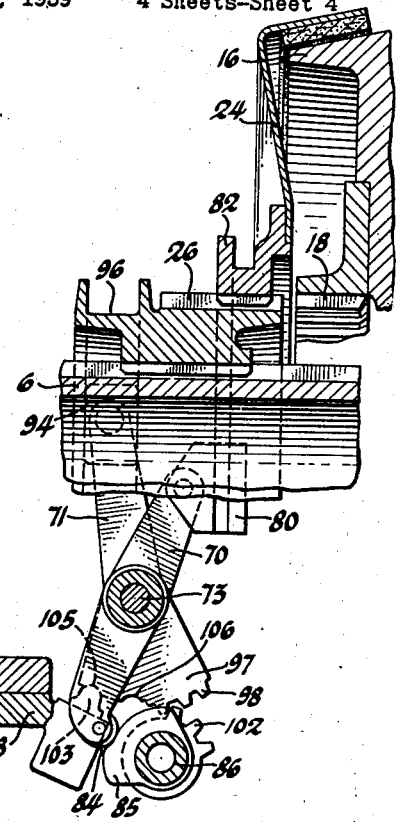
Fig. 9
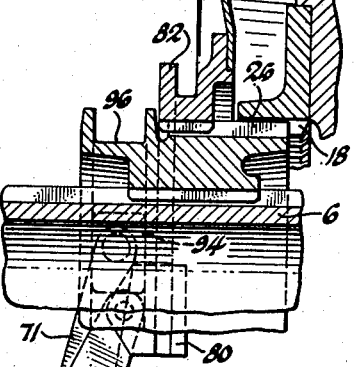
Fig. 10
Inventor
Edward V. Rippingille
By 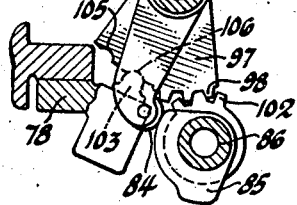
Attorneys Patented May 18, 1943

2,319,366

UNITED STATES PATENT OFFICE 2,319,366

CLUTCH MECHANISM

Edward V. Rippingille, Detroit, Mich., assignor to General Motors Corporation, Detroit, Mich., a corporation of Delaware Original application February 6, 1939, Serial No. 254,893, now Patent No. 2,284,589, dated May 26, 1942. Divided and this application April 15, 1942, Serial No. 439,117

4 Claims. (Cl. 192—53)

This invention is a division of copending application Serial No. 254,893, filed February 6, 1939, now Patent 2,284,589, issued May 26, 1942.

It relates especially to friction synchronizing and dog clutch means for transmitting a drive from one shaft to another.

The object of the invention is a shifting mechanism which first fully engages the synchronizing clutch to bring the driving shaft to the speed of the driven shaft, and then slightly releases the synchronizing clutch to allow creeping of the dog clutch members relatively to each other, to facilitate engagement thereof.

The above and other objects of the invention will be apparent as the description proceeds.

The drawings show the drive from the vertically disposed crankshaft of an internal combustion engine, to a propeller shaft disposed perpendicularly thereto.

In the drawings:

Figure 1a shows a propeller mounted on an extension of the propeller shaft.

Figure 4 is a part sectional view on line 4—4 of Figure 2.

Figure 5 is a sectional view with part broken away, on line 5—5 of Figure 2.

Figure 6 is a part sectional view of a part, on line 6—6 of Figure 1.

Figure 7 is a part broken away view, on line 7—7 of Figure 6.

Figures 8 to 10 are enlarged, somewhat diagrammatic views, showing various positions of the reverse synchronizing and dog clutches, respectively.

Figure 1:
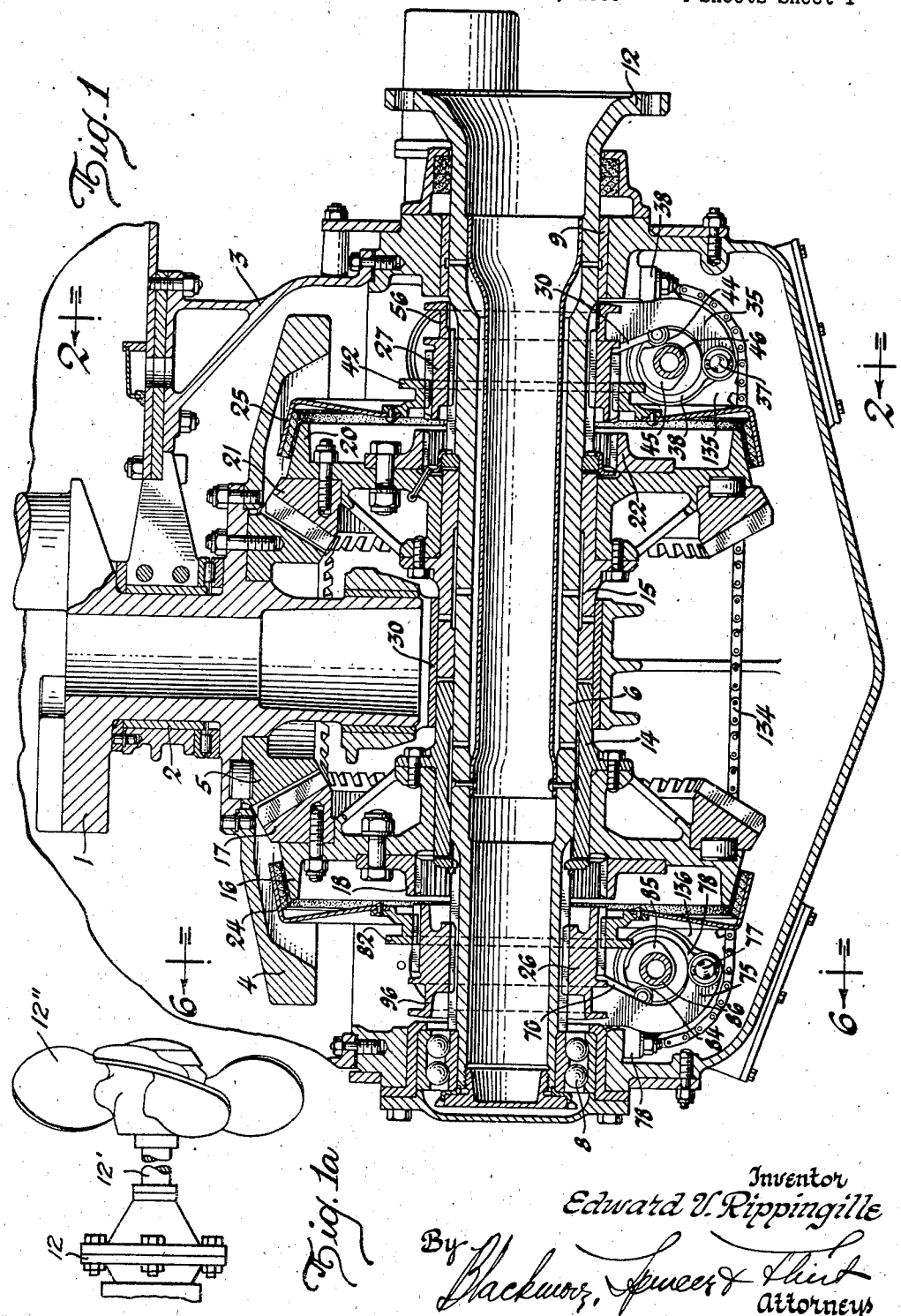
Figure 1 is a vertical sectional view longitudinally of the propeller shaft.

As shown most clearly in Figure 1, the engine crankshaft 1 is vertically disposed and supported in bearings such as 2 in the engine frame 3.

Mounted on the lower end of the crankshaft 1 is a flywheel 4, and a bevel wheel 5 which is shrouded by the flywheel.

Below the crankshaft 1 is a tubular propeller shaft 6 with its axis at right angles to the axis of the crankshaft. The propeller shaft 6 is supported at one end in a double thrust ball bearing 8, and at the other end in a plain bearing 9, in the engine frame. A coupling flange 12 is provided at one end of the propeller shaft, for an extension 12' thereof on which is mounted a propeller 12''.

Sleeved over the propeller shaft are a pair of tubular members 14 and 15. Secured to the member 14 are a cone clutch member 16, a bevel wheel 17, and a dog clutch member 18. A cone clutch member 20, a bevel wheel 21, and a dog clutch member 22 are similarly secured to the member 15.

The bevel wheels 17 and 21 are in mesh with the bevel wheel 5 at diametrically opposite points thereof, and hence are driven in opposite directions thereby.

Coacting with the cone clutch members 16 and 20, and the dog clutch members 18 and 22 respectively, of the bevel wheels 17 and 21, are cone clutch members 24 and 25, and dog clutch members 26 and 27 respectively. The dog clutch members 26 and 27 are splined to the propeller shaft 6, and the cone clutch members 24 and 25 are splined respectively to the dog clutch members 26 and 27.

A bearing 30 surrounds the two sleeves 14 and 15, and through them supports the propeller shaft 6 intermediately of its bearings 8 and 9.

The cone clutches 16, 24, and 20, 25 are friction clutches for synchronizing the speeds of the shaft 6 and the bevel wheels 17 and 21 to facilitate the engagement of the positive dog clutches 18, 26, and 22, 27, respectively.

Accordingly, as one or the other of the bevel wheels 21 and 17 is in clutch engagement with the shaft 6, the latter turns in one direction or the other. It will be assumed hereafter that the bevel wheel 21 turns the shaft 6 in a "forward" direction, and the bevel wheel 17 turns it in a "reverse" direction.

The direction of rotation of the engine crankshaft and the helical hand of the propeller are such that the thrust axially of the shaft 6 between the bevel wheel 5 and either of the bevel wheels 17 and 21 is in each instance in an opposite direction to the thrust of the propeller in either a "forward" or "reverse" direction, thereby very materially reducing the need for other means of taking these thrusts.

Thus, assuming clockwise rotation of the crankshaft 1 (as seen from above in Figure 1), a propeller with a left hand helix, as shown in Figure 1a, connected to the coupling flange 12, will give a thrust to the left when driven through the bevel wheel 21, and a thrust to the right when driven through the bevel wheel 17, a propeller with a right hand helix will give a thrust to the right when driven through the bevel wheel 21 and a thrust to the left when driven through the bevel wheel 17.

With clockwise rotation of the crankshaft 1, the thrust in either direction of a propeller with a left hand helix will be balanced to a considerable extent by the thrust between the bevel wheels 17 or 21, and 5, of its driving means; a propeller with a right hand helix would require anti-clockwise rotation of the crankshaft 1 (as seen from above) for this condition to be satisfied.

Figure 2:
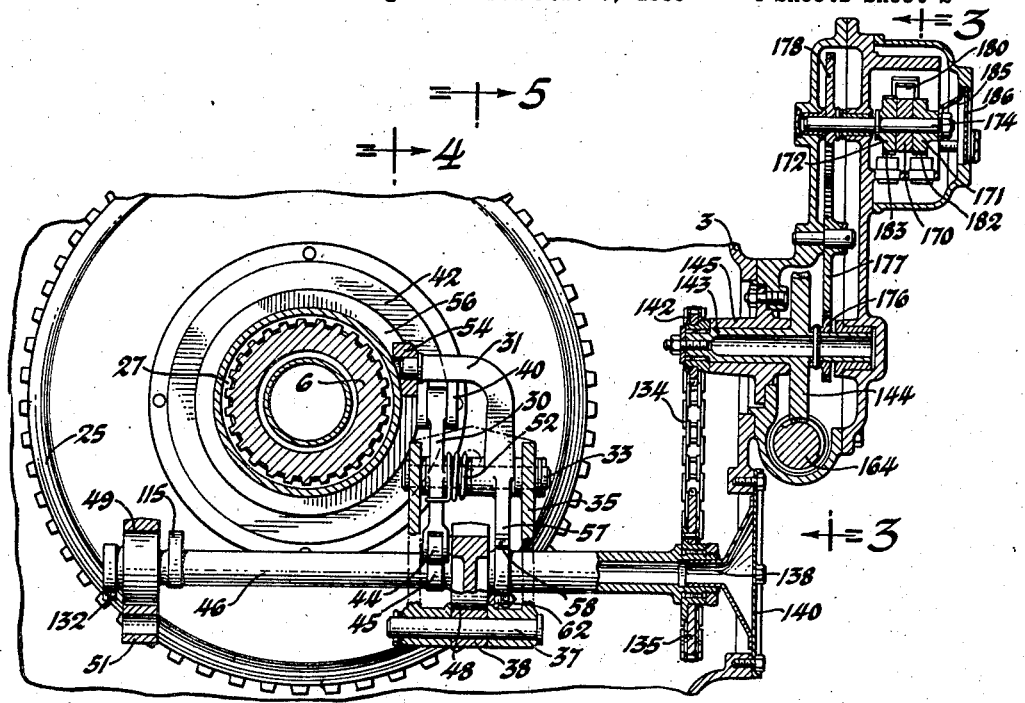
Figure 2 is a partly broken away sectional view on line 2—2 of Figure 1, and showing the mechanical part of the electric control and driving means for shifting the clutches.

As best shown in Figures 2, 4, and 5, movement of the synchronizing clutch member 25 and the dog clutch member 27, to effect engagement and disengagement of the "forward" drive clutches, is effected by levers such as 30 and 31, respectively. The levers 30 and 31 are fulcrumed intermediately of their ends, on a pin 33, in a bracket 35 which is pivotable about a pin 37 in a bracket 38, of the engine frame.

One end of the lever 30 has pivotally connected thereto a shoe 40 embracing a flange 42 on the boss of the synchronizing clutch member 25. The other end of the lever 30 is provided with a roller follower 44 for a cam 45 on a tubular shaft 46 extending transversely of the shaft 6, and supported in suitable bearings 48 and 49 respectively in the bracket 38 and a similar bracket 51 spaced from the bracket 38 on the engine frame. The lever 30 is yieldingly held with its roller 44 against the cam 45 by a torsion coil spring 52.

One end of the lever 31 has pivotally connected thereto a shoe 54 engaging an annular groove 56 in the outer circumference of the dog clutch 27. The other end of the lever 31 is in the form of a sector 57 having a number of teeth 58 adapted to be engaged by the teeth of a gear segment 62 on the shaft 46, and capable only of moving the sector 57 through a part of a revolution in either direction. A spring loaded detent 63 is mounted in the bracket 38 on the engine frame, and tends to hold the lever 31 and with it the dog clutch 27 in a disengaged or in engaged position, accordingly as it engages one or the other of two depressions 65 and 66, spaced from each other on the periphery of the sector 57.

Movement of the synchronizing clutch member 24 and the dog clutch member 26, to effect engagement and disengagement of the reverse clutches, is effected by levers such as 70 and 71 and associated parts, which are similar if not identical with the levers such as 30 and 31 and their associated parts thus far described. The levers 70 and 71 are fulcrumed intermediately of their ends, on a pin 73 in a bracket 75, which is pivotable about a pin 77 in a bracket 78 of the engine frame.

One end of the lever 70 has pivotally connected thereto a shoe 80, embracing a flange 82 on the boss of the synchronizing clutch member 24. The other end of the lever 70 is provided with a roller follower 84, for a cam 85 on a tubular shaft 86 extending transversely of the shaft 6, and supported in suitable bearings (not shown), similar to those for the shaft 46.

The lever 70 is yieldingly held with its roller 84 against the cam 85, by a torsion coil spring 92.

One end of the lever 71 has pivotally connected thereto a shoe 94 engaging an annular groove 96 in the outer circumference of the dog clutch 26. The other end of the lever 71 is in the form of a sector 97 having a number of teeth 99 adapted to be engaged by the teeth of a gear segment 102 on the shaft 86, and capable only of moving the sector 97 through a part of a revolution in either direction. A spring loaded detent 103 is mounted in the bracket 78 on the engine frame and tends to hold the lever 71 and with it the dog clutch 26 in a disengaged or an engaged position accordingly as it engages one or the other of two depressions 105 and 106, spaced from each other on the periphery of the sector 97.

In order to obviate any cocking of the clutch members consequent upon the application of a clutch engaging force at only one point at the periphery of the clutch members, each of the tubular cross shafts 46 and 86 may be provided with a cam and gear sector such as 115 and 132 (as shown in Figure 2) duplicating on the opposite side of the propeller shaft 6, the cam 45 and gear sector 62, and the cam 85 and gear sector 102 on the shafts 46 and 86 respectively, for actuating levers and associated parts (not shown), similar to the levers 30, 31 and 70, 71 and which are moved, of course, identically with their respective counterparts.

The shafts 46 and 86 of the "forwards" and "reverse" shifting mechanism are connected by a roller chain 134, for which they are provided at one end with chain wheels 135 and 136 respectively. The ends of each of the shafts 46 and 86 to which the chain wheels 135 and 136 are connected are supported respectively by tubular spigots 138 and 139 formed on cover plates 140 and 141 of the engine frame, as shown in Figures 2 and 6.

The roller chain 134 is driven by a sprocket wheel 142, above the chain wheel 135, and secured to the tubular spindle 143 of a worm wheel 144, which has a bearing 145 in the engine frame.

As shown best in Figures 6 and 7, above the chain wheel 136 a sprocket 147 has a bearing on a spigot 149 which is eccentrically mounted on a plate 150. The plate 150 has a plurality of circumferentially disposed holes 151, through any of which it may be secured to the engine frame along with a cover plate 153, by bolts such as 154.

The roller chain 134 passes over the sprocket 147 which, because of the eccentric mounting of its spigot 149 on the plate 150, may be moved by turning of the plate 150 into different positions relatively to the engine frame and the bolts 154, to adjust the tension or take up slack in the chain 134.

The position of the brackets such as 35 and 75 about their pivot pins such as 37 and 77 can be varied within limits by means of adjusting screws such as 156 and 157 through the engine frame (as shown in Figure 4), to adjust the position of the fulcrums 33 and 73 of the levers 30, 31 and 70, 71, to compensate for wear of the linings of the synchronizing clutches 20, 25 and 16, 24.

Figure 3:
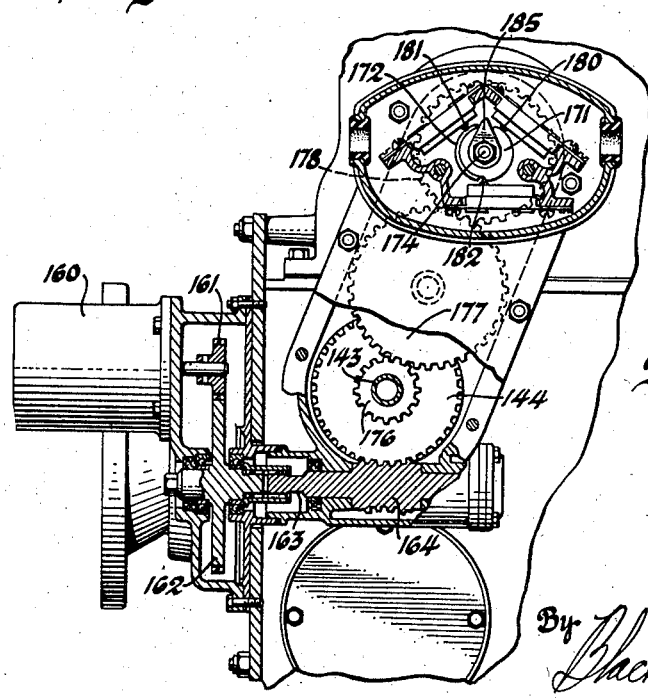
Figure 3 is a part sectional view of a part of Figure 2, on line 3—3 of Figure 2.

The worm wheel 144 is driven from a reversible electric motor 160, through a reduction gear comprising a pinion 161, and a gear wheel 162 having a splined coupling with the shaft 163 of a worm 164, as shown in Figure 3.

In Figure 1 the clutch members 25, 27, and 24, 26 are shown in a neutral position in which no drive is transmitted from the engine crankshaft 1 to the propeller shaft 6. Figures 4 and 5 show the levers such as 30, 31, and 70, 71 in a corresponding position.

Referring now to Figures 8 to 10 showing various positions of the "reverse" drive clutches; in Figure 8 the shaft 86 has been turned 55° in an anti-clockwise direction from its position in Figure 1. The roller follower 84 of the lever 70 is on the peak of the cam 85, and thereby the lever 70 has been turned about its fulcrum 73, fully engaging the synchronizing clutch members 16 and 24, and transmitting a "reverse" drive therethrough to the shaft 6.

In Figure 9, the shaft 86 has been turned a further 31° (or 86° from neutral), and the contour of the cam 85 is such that the synchronizing clutch members 16 and 24 have been released slightly, allowing creeping of the dog clutch members 18 and 26 relatively to each other. It will be noted that the gear segment 102 is just about to engage the teeth 98 of the gear sector 97 of the lever 71.

In Figure 10 the shaft 86 has been turned a still further 64° (or 150° from neutral); the gear segment 102 has turned the gear sector 97 from a position in which the spring loaded detent 103 engages the depression 105 and the dog clutch 18 and 26 is disengaged, to a position in which the detent 103 engages the depression 106 and the dog clutch 18 and 26 is fully engaged.

The sequence of movement of the "forward" drive clutches when moving from "neutral" into "forward" or "ahead" position is exactly similar to that just described for the "reverse" drive clutches.

The two shafts 46 and 86 turn together through the same angle because of their connection by the roller chain. They are turned through 150° in one direction from neutral to engage one of the dog clutches 18, 26 or 22, 27; back through 150° in an opposite direction, to neutral; and through a further 150° in that direction, to engage the other of the dog clutches 18, 26, or 22, 27. Thus the shafts are turned through a total of 300° between fully engaged positions of the clutches for forward and reverse drive respectively.

It will be observed that the cams and gear segments are such that through 150° of their rotation in either direction they leave one or the other of the sets of levers 30, 31 and 70, 71 entirely unaffected, so that throughout the operation of engagement and disengagement of the clutches for forward drive, the reverse clutches remain disengaged, and vice versa.

In order that the shafts 46 and 86 may be turned through the required 150° in either direction from neutral by the motor 160, a suitable control means for the motor 160 is provided.

I claim:

1. In a friction synchronizing and dog clutch mechanism between a driving and a driven member, a shift lever for the friction synchronizing clutch, a shift lever for the dog clutch, a cam for moving the shift lever for the synchronizing clutch, and a toothed gear segment for moving the shift lever for the dog clutch; said cam and said toothed gear segment being secured to a single turnable shaft, and said cam being so shaped and phased in relation to the toothed gear segment that upon turning said turnable shaft, the cam first moves its shift lever to fully engage the synchronizing clutch to bring the driven member to the speed of the driving member, and then slightly releases the synchronizing clutch to allow relative creeping between the driving and driven members while the toothed gear segment moves its shift lever to engage the dog clutch.

2. The combination according to claim 1, in which the shiftable dog clutch is splined to the driven member, and the shiftable friction synchronizing clutch is splined to the dog clutch.

3. The combination according to claim 1, in which a spring detent tends to hold the shift lever for the dog clutch in positions corresponding respectively to the engaged and disengaged positions thereof.

4. The combination according to claim 1 in which the shift levers are fulcrumed on a pin in a bracket which is adjustable about a fixed axis to compensate for wear of the lining of the synchronizing clutch.

EDWARD V. RIPPINGILLE.